United States Patent
Shea et al.

(10) Patent No.: US 10,054,739 B2
(45) Date of Patent: Aug. 21, 2018

(54) QSFP DOUBLE DENSITY MODULE

(71) Applicants: Owen Shea, Edinburgh (GB); Bardia Pezeshki, Menlo Park, CA (US); Andrew Grant, Linlithgow Bridge (GB); Jamie Stokes, Linlithgow (GB); Henk Bulthuis, Newark, CA (US); Dinh Ton, Newark, CA (US); Ramsey Selim, Edinburgh (GB)

(72) Inventors: Owen Shea, Edinburgh (GB); Bardia Pezeshki, Menlo Park, CA (US); Andrew Grant, Linlithgow Bridge (GB); Jamie Stokes, Linlithgow (GB); Henk Bulthuis, Newark, CA (US); Dinh Ton, Newark, CA (US); Ramsey Selim, Edinburgh (GB)

(73) Assignee: Kaiam Corp., Newark, CA (US)

( * ) Notice: Subject to any disclaimer, the term of this patent is extended or adjusted under 35 U.S.C. 154(b) by 0 days.

(21) Appl. No.: 15/707,801

(22) Filed: Sep. 18, 2017

(65) Prior Publication Data
US 2018/0081117 A1    Mar. 22, 2018

Related U.S. Application Data

(60) Provisional application No. 62/396,024, filed on Sep. 16, 2016.

(51) Int. Cl.
*G02B 6/12* (2006.01)
*G02B 6/293* (2006.01)
(Continued)

(52) U.S. Cl.
CPC ....... *G02B 6/12016* (2013.01); *G02B 6/0058* (2013.01); *G02B 6/12033* (2013.01);
(Continued)

(58) Field of Classification Search
CPC .............. G02B 6/12016; G02B 6/0058; G02B 6/2938; G02B 6/12033; G02B 2006/12164; H04B 10/40
See application file for complete search history.

(56) References Cited

U.S. PATENT DOCUMENTS 6,459,829 B1  10/2002  Yamauchi et al.
9,025,958 B1   5/2015  Ketelsen et al.
(Continued)

FOREIGN PATENT DOCUMENTS

EP    0663708 A1    7/1995

OTHER PUBLICATIONS

International Search Report on related PCT Application No. PCT/US2017/052097 from International Searching Authority (KIPO) dated Jan. 11, 2018.
(Continued)

*Primary Examiner* — John M Bedtelyon
(74) *Attorney, Agent, or Firm* — Klein, O'Neill & Singh, LLP

(57) ABSTRACT

An optical transceiver may include pairs of lasers, each laser of a particular pair generating light at the same wavelength and each pair of lasers generating light at different wavelengths. The light from the lasers may be demultiplexed onto a pair of outputs, with each output receiving light from different lasers of each pair of lasers.

20 Claims, 6 Drawing Sheets

(51) Int. Cl.
*F21V 8/00* (2006.01)
*H04B 10/40* (2013.01)

(52) U.S. Cl.
CPC .......... *G02B 6/2938* (2013.01); *H04B 10/40* (2013.01); *G02B 2006/12164* (2013.01)

(56) References Cited

U.S. PATENT DOCUMENTS

| | | | |
|---|---|---|---|
| 9,372,306 B1 * | 6/2016 | Nagarajan | G02B 6/12004 |
| 9,923,635 B2 * | 3/2018 | Ho | G02B 6/4292 |
| 2016/0191151 A1 | 6/2016 | Nagarajan | |
| 2016/0246008 A1 | 8/2016 | Tan et al. | |
| 2017/0359126 A1 * | 12/2017 | Ho | H04B 10/40 |
| 2018/0017745 A1 * | 1/2018 | Lin | G02B 6/4246 |
| 2018/0091250 A1 * | 3/2018 | Soldano | G02B 6/34 |

OTHER PUBLICATIONS

Written Opinion on related PCT Application No. PCT/US2017/052097 from International Searching Authority (KIPO) dated Jan. 11, 2018.

* cited by examiner

QSFP DOUBLE DENSITY MODULE

CROSS REFERENCED APPLICATIONS

This application claims the benefit of the filing date of U.S. Provisional Patent Application No. 62/396,024 filed Sep. 16, 2016 entitled "QSFP Double Density Module," the disclosures of which are incorporated by reference herein.

FIELD OF THE INVENTION

The present invention relates generally to optical communications, and more particularly to a double density optical transceiver.

BACKGROUND OF THE INVENTION

Optical transceivers are generally used in optical data communications applications. These transceivers generally transmit data over one fiber optic line, and receive data over another fiber optic line. The data may be transmitted and received over a plurality of wavelengths, with for example a channel of data at each wavelength.

Increasing data rates, e.g., increasing amount of data transmitted and received by an optical transceiver often poses difficulties. Increasing transmission speeds is often non-trivial, and increasing numbers of channels of data also presents multiple problems.

BRIEF SUMMARY OF THE INVENTION

Some embodiments include an optical transceiver having a double density module. In some embodiments the double density module is housed in a small form-factor pluggable (SFP) transceiver housing, and for example may be part of a quad small form-factor pluggable (QSFP) type transceiver.

In some embodiments the double density module includes a plurality of paired laser diodes, each of the pairs of laser diodes generating light at different wavelengths, and each laser diode of a particular pair of the laser diodes generating light at the same wavelength. Light from the laser diodes is passed through a planar lightwave circuit (PLC), for example including a pair of optical multiplexers, which may be in the form of arrayed waveguide gratings (AWGs), with light from a first laser diode of each pair being provided to a first transmit output of the PLC and light from a second laser diode of each pair being provided to a second transmit output of the PLC. The first transmit output of the PLC is coupled to a first optical fiber and the second transmit output of the PLC is coupled to a second optical fiber.

In some embodiments the double density module also includes a pair of optical demultiplexers, with a first optical demultiplexer receiving light from a third fiber optic line and a second optical demultiplexer receiving light from a fourth fiber optic line. The optical demultiplexers may be on the same PLC as the optical multiplexers, and also may be in the form of AWGs. Light from the optical demultiplexers is passed to a plurality of PLC receive side outputs, from which the light is passed to photodiodes for conversion to electrical signals. In some embodiments the photodiodes are mounted off an edge of the wafer of the PLC, with the photodiodes wirebonded to transimpedance amplifiers (TIAs), and in some embodiments the TIAs are mounted on a same substrate as the chips for the laser diodes.

In some embodiments each pair of laser diodes is on a corresponding chip, with a different chip for each of the pairs. In some embodiments each laser diode is on its own chip. In some embodiments all of the laser diodes are on the same chip.

In some embodiments light from the lasers is coupled to the PLC by lenses on or part of a MEMS device. The MEMS device may be as discussed in U.S. Pat. No. 8,346,037, entitled MICROMECHANICALLY ALIGNED OPTICAL ASSEMBLY, and issued on Jan. 1, 2013, U.S. patent application Ser. No. 14/543,762, entitled MEMS-BASED LEVERS AND THEIR USE FOR ALIGNMENT OF OPTICAL ELEMENTS, and filed Nov. 17, 2014, or U.S. Patent Provisional Patent Application No. 62/395,802, entitled OPTICAL MODULE FOR TERABIT SWITCH, and filed on Sep. 16, 2016, the disclosures of all of which are incorporated herein by reference for all purposes. In some embodiments a MEMS device includes a pair of arms for adjusting position of lenses of the MEMS device, with two lenses per MEMS device, one for each laser of a pair of lasers.

In some embodiments the first, second, third, and fourth fiber optic lines are mounted to a fiber v-groove array, which may be placed against the PLC.

In some embodiments monitor photodiodes are used for monitoring laser power. In some embodiments the monitor photodiodes are supplied light through the PLC, and the monitor photodiodes may be on a same side of the wafer for the PLC as the transmit outputs of the PLC. In some embodiments input waveguides of the PLC for light from the lasers may include a grayscale mirror, or a mirror may be placed on a waveguide branch, with the mirror for example reflecting light out of the PLC to monitor photodiode, for example placed on top of the wafer for the PLC.

These and other aspects of the invention are more fully comprehended upon review of this disclosure.

DETAILED DESCRIPTION

Figure 1:
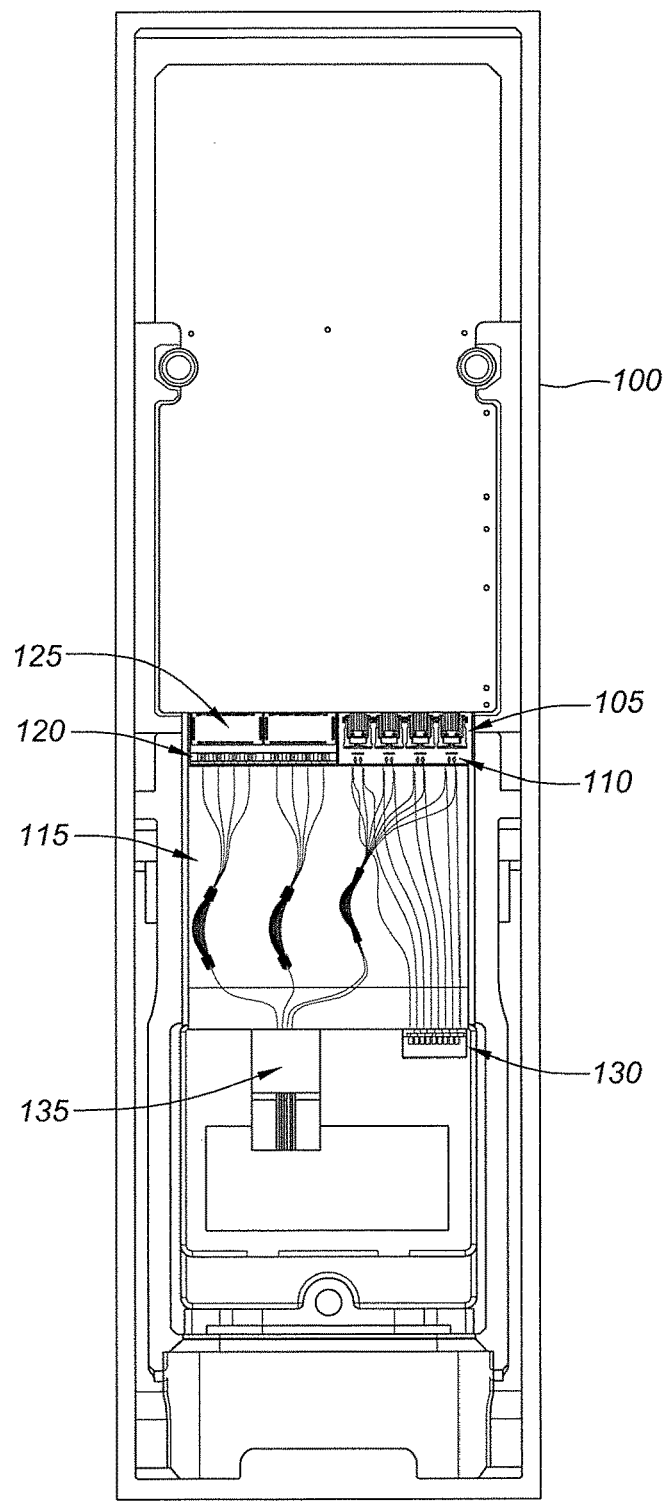
FIG. 1 is a top view of a SFP housing including a double density module in accordance with aspects of the invention.

FIG. 1 illustrates an SFP type housing 100 with an optical transceiver. The optical transceiver includes four pairs of laser diodes 105. In the embodiment of FIG. 1, each pair of lasers is on their own chip, although in various embodiments each laser may be on their own chip, or all of the lasers may be on a common chip. The laser diodes may be DFB lasers or, in various embodiments, other types of lasers. In some embodiments the laser diodes are directly modulated, so that activation of the lasers provides for data transmission. In some embodiments modulators are paired with the lasers, with the modulators impressing data on the light from the lasers, which may be operated as continuous wave (CW) lasers.

Lenses 110 are positioned in front of output facets of the pairs of lasers diodes, with a lens for each of the laser diodes.

The lenses 110 are on a MEMS device, for example a MEMS device for each pair of laser diodes 105, which allows for positioning of lenses 110 to direct light into transmit side inputs of a PLC 115. In some embodiments the MEMS device includes a holder for each of two lenses, and two moveable arms coupled to the holder, with the holder coupled to a substrate such that movement of the arms results in movement of the lenses, demagnified as compared to movement of the arms. Once the lenses 1101 are positioned to pass light from the lasers to inputs of the PLC 115, the arms may be fixed in position, through application of solder, adhesive, or other material, for example.

The PLC 115 includes multiplexers to provide light to first and second transmit output of the PLC, with for example the first transmit output passing light from a first laser diode of each pair of laser diodes, and the second transmit output passing light from a second laser diode of each pair of laser diodes. The PLC 115 also includes demultiplexers to pass light from a first and second receive input of the PLC 115 to eight receive outputs of the PLC 115. The PLC 115 may be implemented as a single PLC, as illustrated in FIG. 1, or multiple PLCs may instead be used. The multiplexers and demultiplexers may be implemented as AWGs, although other wavelength selective structures may instead be used.

Fiber optic lines are coupled to the PLC, with in the embodiment of FIG. 1 a fiber optic line provided for each transmit output and each receive input of the PLC. The fiber optic lines may be positioned in a fiber v-groove array 135, butt coupled to the PLC 115, as shown in FIG. 1.

Photodiodes 120 are positioned to receive light at the receive outputs of the PLC. In some embodiments, the photodiodes 120 are on a same substrate as the laser diodes 105, or either may be on a submount on that same substrate. In some embodiments, the photodiodes 120 may be positioned on the PLC 115, with the PLC 115 for example including a mirror to reflect light out of the PLC. In such instances, wire traces may be placed on the PLC 115 for carrying electrical signals from the photodiodes 120. The electrical signals are provided to TIAs 125. The TIAs 125 may be co-packaged with the photodiodes, or, as illustrated in FIG. 1, on the same substrate as the laser diodes and/or photodiodes.

Monitor photodiodes (MPDs) 130 are used to monitor power output of the laser diodes. In the embodiment of FIG. 1, the MPDs 130 are on a same side of the PLC 115 as the transmit outputs and receive inputs. Waveguide branches from the transmit inputs of the PLC 115 provide light to the MPDs 130. In some embodiments gray scale mirrors are placed in transmit input waveguides, instead, with the gray scale mirrors reflecting a small portion of the input light to MPDs 125 placed on top of the PLCs 115.

In some embodiments, optical transceivers includes a transmitting portion and a receiving portion. In some of these embodiments, a transmitting portion of the optical transceiver includes four dual laser diodes with each of the dual laser diodes modulating a different selected wavelength. Four dual lens are paired with dual laser diodes with each lens array being paired with a particular one of the four dual laser diodes. A PLC chip includes a multiplexer AWG with 8 inputs. The multiplexer AWG routes the four wavelengths emitted from each laser diode in the pairs of laser diode from the lenses into the AWG and multiplexes the wavelengths into two waveguides, each waveguide carries four wavelengths. Outputs of the AWG couple to the fiber, or FVA. MPDs on the PLC monitor the lasers. In accordance with many embodiments, regular MPDs placed at the far end of the PLC chip on an opposite end from the incoming light wavelengths from the laser diodes. In accordance with a number of these embodiments, metal tracks on the PLC to drive the MPDs. In accordance with many other embodiments, grayscale mirrors are positioned in waveguides to reflect light to the MPDs. The MPDs are mounted on top of the PLC and metal tracks on the PLC drive the MPDs.

In some embodiments, the receive portion of the optical transceivers include two input fibers that receive light signals in four wavelengths. Each input fiber couples to a separate AWG in the PLC configured as a demultiplexer. Each AWG demultiplexes the four wavelengths of light signals from the input fibers into four independent wavelengths. The four wavelengths from each of the AWGs is coupled to a separate to PD and TIA. In accordance with many embodiments, the PDs are mounted at the edge of the chip and wirebonded to the TIAs. In a number of embodiments, grayscale mirrors in the PLC reflect the light of each wavelength to PDs mounted on top of the PLC. In many of these embodiments, the TIAs are mounted on top of the PLC with metal tracks running on the PLC.

In some embodiments, the device of FIG. 1 provides four dual transmit lanes, each at 2×25G, using 50 Gb/s NRZ lanes, with a total capacity of 200 Gb/s.

Figure 2:
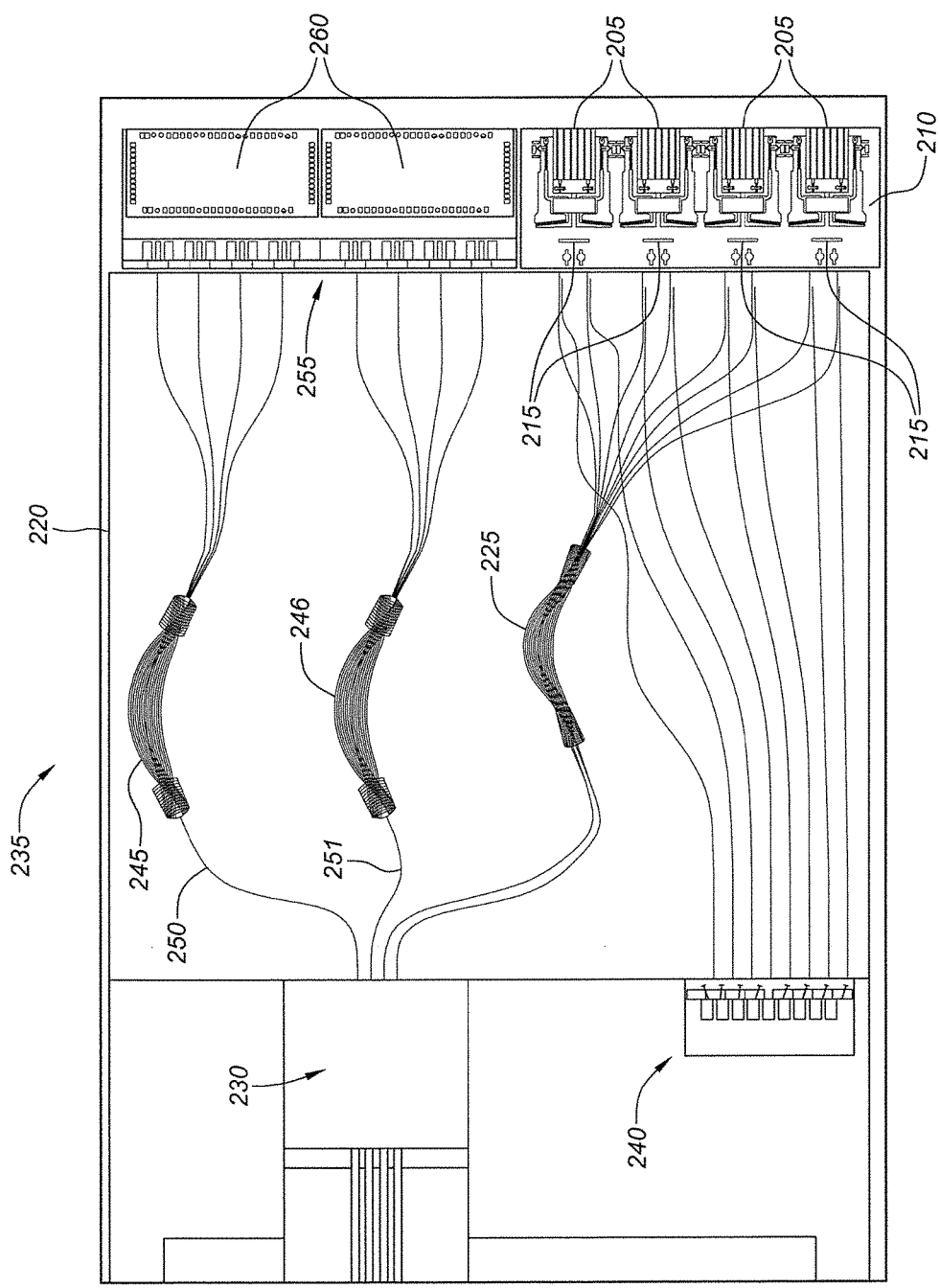
FIG. 2 is a diagram of a double density module in accordance with aspects of the invention.

FIG. 2 is an illustration showing various components of the device of FIG. 1 in additional detail. In FIG. 2, four laser chips 205 are on a first submount 210. Each of the laser chips include a pair of laser diodes. Each pair of laser diodes transmits light at the same wavelength, with lasers on different laser chips transmitting light at different wavelengths. Accordingly, light at each of four wavelengths is generated. Lenses 215 on a MEMs device, on a per pair of laser basis, direct light from the lasers into transmit input waveguides of a PLC 220. The transmit input waveguides are coupled to a single transmit multiplexer 225, which routes light from a first laser diode of each pair to a first transmit output and light from a second laser diode of each pair to a second transmit output. Each transmit output therefore passes light at four different wavelengths. The transmit outputs are each coupled to a fiber mounted in a fiber v-groove array 230.

A monitor waveguide 235 branches off of each receive input waveguide, with the monitor waveguides only receiving a small portion of light in the input waveguides. The monitor waveguides 235 extend to the same side of the PLC 220 as the transmit outputs. Monitor photodiodes 240 are positioned to receive light from outputs of monitor waveguides 235. Signals from the monitor photodiodes 240 may be passed on traces over the top of the PLC 220, for use in monitoring and/or adjusting laser diode output power.

The PLC 220 also includes two receive demultiplexers 245-246, one for each of two receive fibers 250-251. The first demultiplexer 245 demultiplexes light into a first four receive output waveguides, the second demultiplexer 246 demultiplexes light into a second four receive output waveguides. The output waveguides of demultiplexers 245-246 provide light to photodiodes 255, which are positioned near TIAs 260, which are shown on a same substrate as the laser diodes, although either or both the laser diodes or the TIAs may be mounted on submounts on that substrate.

Figure 3:
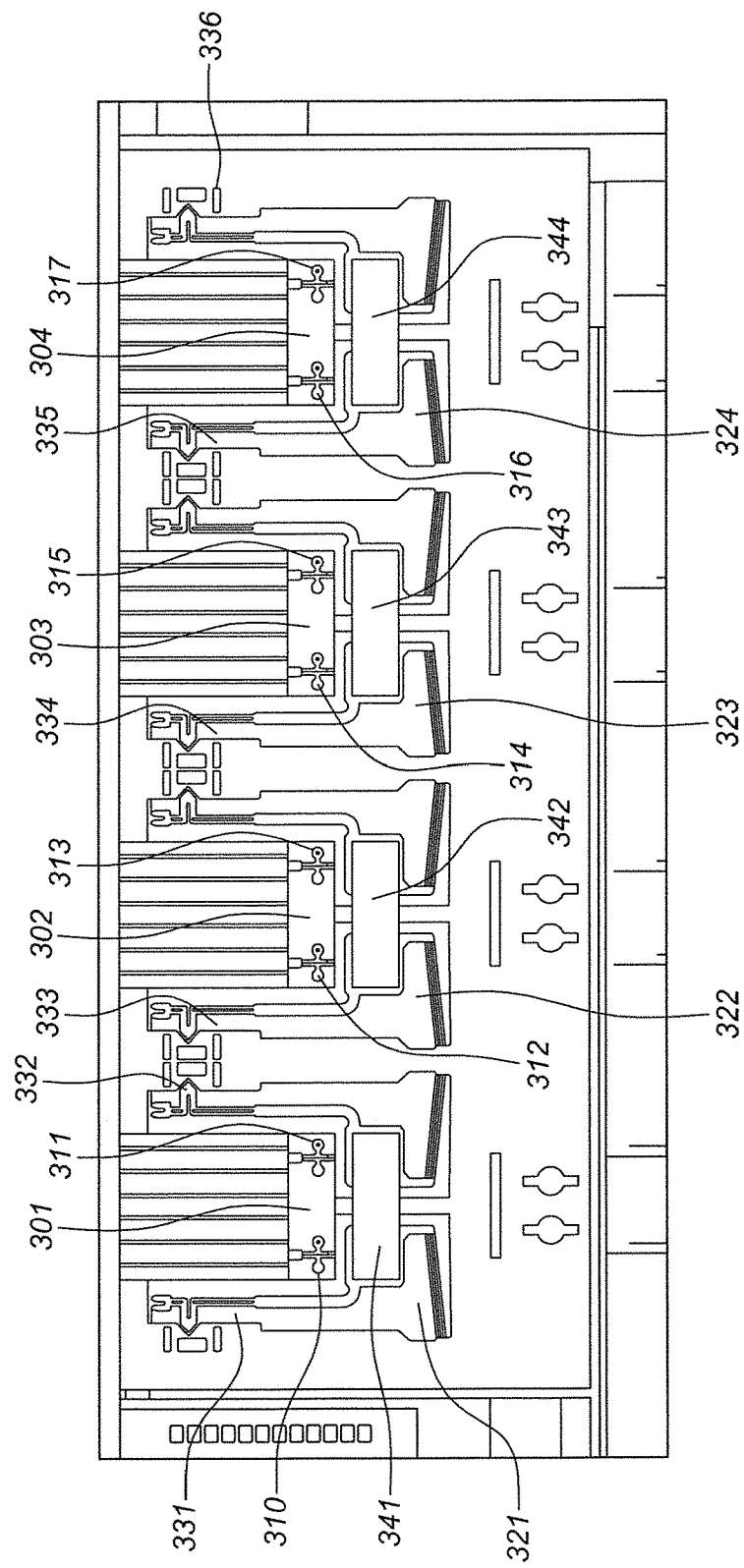
FIG. 3 is a diagram of a transmit optical subassembly in accordance with aspects of the invention.

FIG. 3 shows additional detail for the laser diodes, lenses, and MEMS. Four laser chips 301-304 each include two lasers 310-317. Four MEMs 321-324 each have a platform for holding lenses 341-344 in front of each of the laser chips 310-317. Each MEMS 321-324 also includes a pair of positioning arms 331-336 extending towards a rear of the laser chip.

Figure 4:
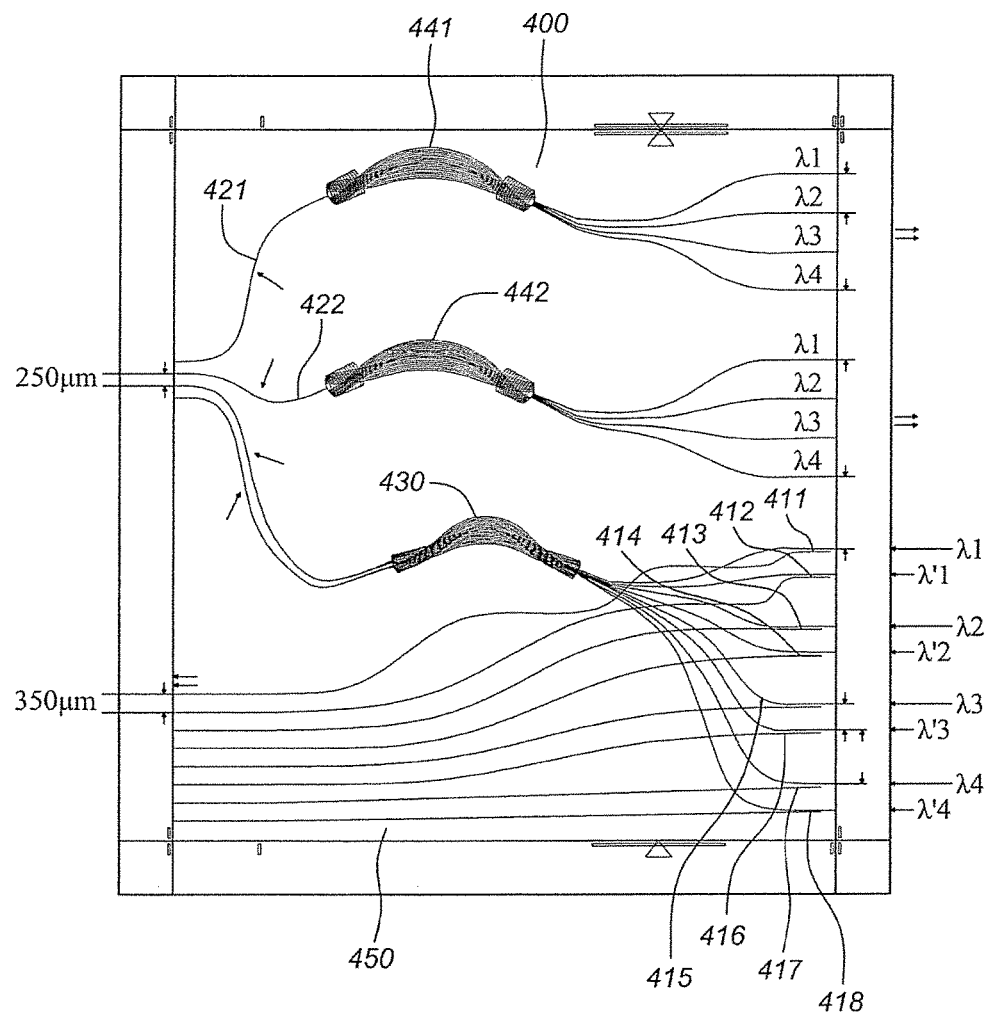
FIG. 4 is a diagram of a PLC in accordance with aspects of the invention.

FIG. 4 shows details of a first PLC which may be used in various embodiments. In the embodiment of FIG. 4, the transmit input waveguides 411-418, receive output waveguides 421-422, multiplexer 430, and demultiplexers 441 and 442 are as discussed with respect to FIG. 2. In the embodiment of FIG. 4, the monitor waveguides branch 450 off the transmit input waveguides 411-418, and extend to a far side of the PLC 400.

Figure 5:
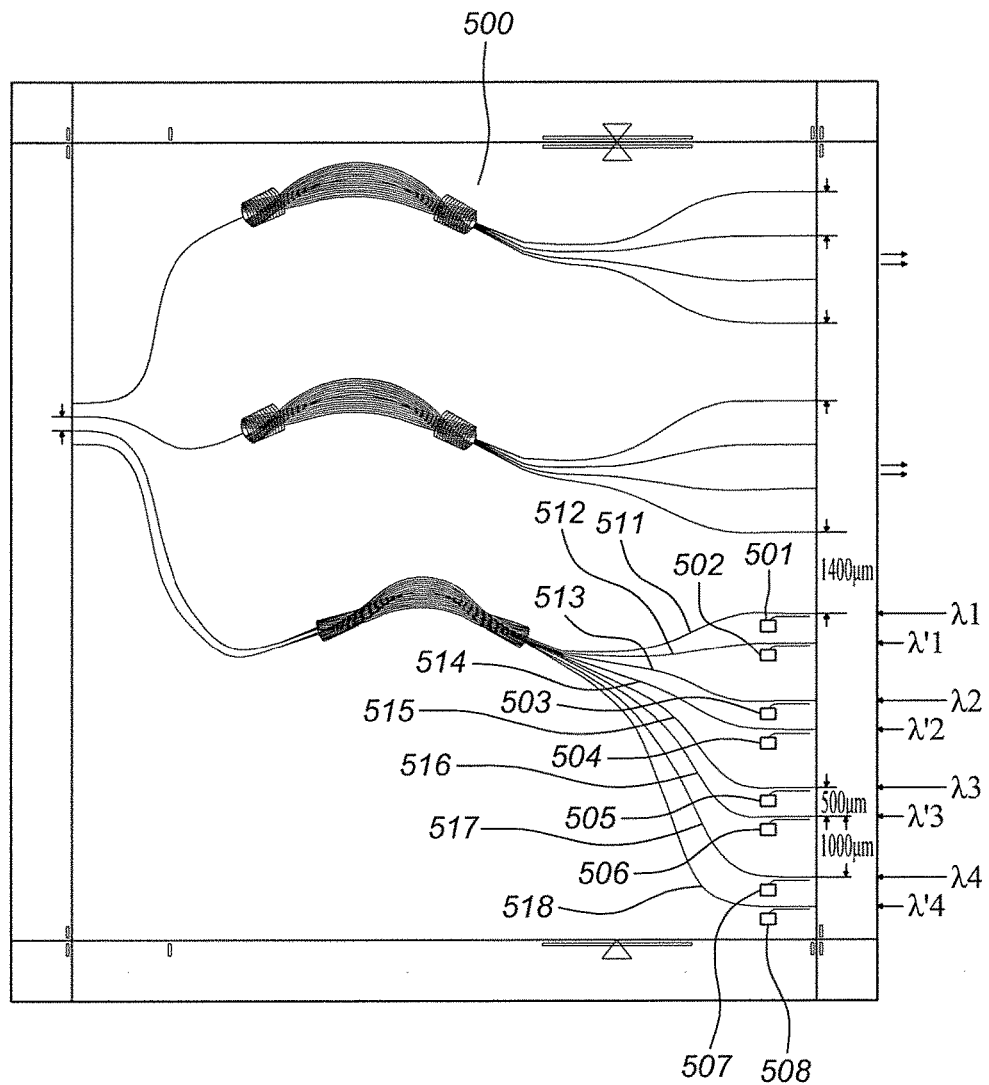
FIG. 5 is a diagram of a further PLC in accordance with aspects of the invention.

FIG. 5 shows details of a second PLC 500, which may be used in various embodiments. In the second PLC 500, gray scale mirrors 501-508 are used for each of the transmit input waveguides 511-518. The gray scale mirrors 502-508 reflect a small portion of the light from the waveguides into monitor photodiodes (not shown) on top of the PLC 500.

Figure 6:
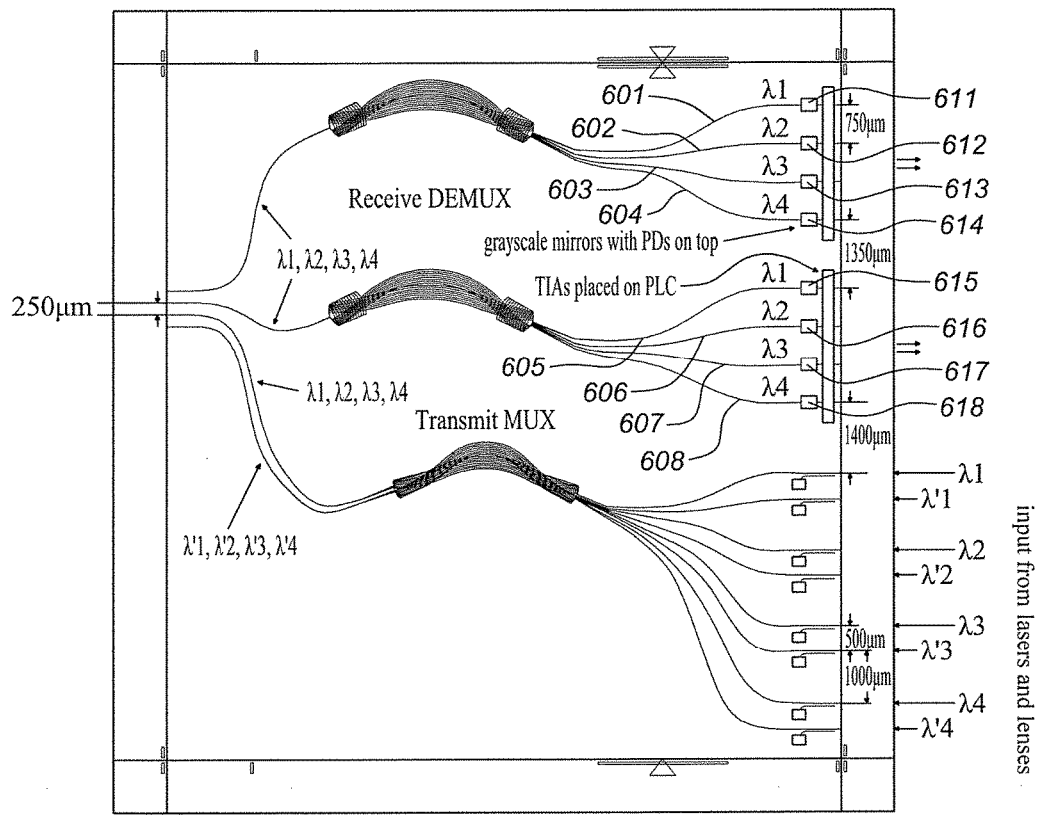
FIG. 6 is a diagram of a still yet further PLC in accordance with aspects of the invention.

FIG. 6 shows details of a third PLC 600, which may be used in various embodiments. The third PLC 600 is like the second PLC 500 (shown in FIG. 5), with the exception that the receive output waveguides 601-608 have mirrors 611-618 for reflecting light out of the PLC 600 to photodiodes (not shown) on top of the PLC 600. In such an embodiment, and as illustrated in FIG. 6, TIAs (not shown) may also be placed on the PLC.

Although the invention has been discussed with respect to various embodiments, it should be recognized that the invention comprises the novel and non-obvious claims supported by this disclosure.

What is claimed is:

1. An optical transceiver, comprising:
  a plurality of pairs of laser diodes wherein each of the plurality of pairs of laser diodes is mounted on a separate chip, is configured to generate light at a different wavelength, and includes a first laser diode and a second laser diode where the first laser diode and the second laser diode of each of the plurality of pairs of laser diodes are configured to generate light at a same wavelength;
  a Planar Lightwave Circuit (PLC) having a first transmit output and a second transmit output;
  a first optical multiplexer in the PLC configured to receive light from the first laser diode of each of the plurality of pairs of laser diodes and to present the light received from the first laser diode of each of the plurality of pairs of laser diodes to the first transmit output of the PLC; and
  a second optical multiplexer in the PLC configured to receive light from the second laser diode of each of the plurality of pairs of laser diodes and to present the light received from the second laser diode of each of the plurality of pairs of laser diodes to the a second transmit output of the PLC.

2. The optical transceiver of claim 1 further comprising:
  a plurality of lens wherein each of the plurality of lens couple light for one of the laser diodes in the plurality of pairs of laser diodes to the PLC.

3. The optical transceiver of claim 2 wherein each of the plurality of lenses is associated with a MEMS device where the MEMS device is configured to adjust the position of an associated lens.

4. The optical transceiver of claim 3 wherein the MEMS device comprises:
  a holder that is configured to hold the associated lens; and
  a first arm and a second arm coupled to holder to position the associated lens to pass light from one of the laser diodes of the plurality of pairs of laser diodes to an input of one of the first and second optical mulitplexers in the TLC.

5. The optical transceiver of claim 1 further comprising:
  a plurality of Monitoring PhotoDiodes (MPDs) that receive light from laser diodes in the plurality of pairs of laser diodes and monitor the power of the laser diodes.

6. The optical transceiver of claim 5 wherein the first and second multiplexers are provided by an Array Waveguide Grating (AWG).

7. The optical transceiver of claim 6 further comprising:
  a plurality of waveguide branches that provide light generated by the laser diodes in the plurality of pairs of laser diodes from the AWG to the plurality of MPDs.

8. The optical transceiver of claim 6 further comprising:
  a plurality of greyscale mirrors positioned in the waveguides of the AWG to reflect light generated by the laser diodes in the plurality of pairs of laser diodes from the AWG to the plurality of MPDs.

9. The optical transceiver of claim 1 further comprising:
  a plurality of photodiodes wherein each of the plurality of photodiodes is configured to convert light of a particular wavelength to electrical signals;
  a first optical demultiplexer that is configured to receive light comprised of a plurality of wavelengths from a first input source, separate the received light into light of each of the plurality of wavelengths, and provide the light of each particular one of the plurality of wavelengths to one of the plurality of photodiodes that converts the particular one of the plurality of wavelengths into electrical signals; and
  a second optical demultiplexer that is configured to receive light comprised of a plurality of wavelengths from a second input source, separate the received light into light of each of the plurality of wavelengths, and provide the light of each particular one of the plurality of wavelengths to one of the plurality of photodiodes that converts the particular one of the plurality of wavelengths into electrical signals.

10. The optical transceiver of claim 9 wherein the first and second optical demultiplexers are in the PLC where the first optical demultiplexer receives light from a first receive input of the PLC and the second optical demultiplexer receive light from a second receive input of the PLC.

11. The optical transceiver of claim 9 further comprising:
  a plurality of TransImpedance Amplifiers (TIA) where each of the plurality of TIAs is wirebonded to a one of the plurality of photodiodes.

12. The optical transceiver of claim 11 wherein the first and second multiplexers are provided by an Array Waveguide Grating (AWG) in the PLC.

13. The optical transceiver of claim 11 further comprising:
  a plurality of grayscale mirror mounted in the PLC to reflect light from the first and second demulitplexers to the plurality of photodiodes.

14. A method for transmitting signals using an optical transceiver, comprising:
  generating light at a plurality of different wavelengths using a plurality of pairs of laser diodes wherein each of the plurality of laser diodes is mounted is mounted on a separate chip and configured to generate light at a different wavelength and each of the plurality of pairs of laser diodes includes a first laser diode and a second laser diode where the first laser diode and the second laser diode of each of the plurality of pairs of laser diodes are configured to generate light at a same wavelength;
  receiving light from the first laser diode of each of the plurality of pairs of laser diodes in a first optical multiplexer;

multiplexing the light received of the first laser diode of each of the plurality of pairs of laser diodes from the first optical multiplexer onto a first transmit output of a PLC; and receiving light from the second laser diode of each of the plurality of pairs of laser diodes in a second optical multiplexer;

multiplexing the light received of the second laser diode of each of the plurality of pairs of laser diodes from the second optical multiplexer onto a first transmit output of a PLC.

15. The method of claim 14 further comprising:
coupling the light from one of the laser diodes in the plurality of pairs of laser diodes to the PLC using one of a plurality of lenses.

16. The method of claim 15 further comprising:
adjusting a position of one of the plurality of lenses a MEMS device.

17. The method of claim 14 further comprising:
receiving light from laser diodes in the plurality of pairs of laser diodes in a plurality of Monitoring Photo-Diodes (MPDs); and
monitoring the power of the laser diodes using the plurality of MPDs.

18. The method of claim 17 wherein the first and second multiplexers are provided by an Array Waveguide Grating (AWG) and the method further comprises:
providing light generated by the laser diodes in the plurality of pairs of laser diodes from the AWG to the plurality of MPDs using a plurality of waveguide branches.

19. The method of claim 17 wherein the first and second multiplexers are provided by an Array Waveguide Grating (AWG) and the method further comprises:
reflecting light generated by the laser diodes in the plurality of pairs of laser diodes from the AWG to the plurality of MPDs using a plurality of greyscale mirrors positioned in the waveguides of the AWG.

20. The method of claim 14 further comprising:
receiving light comprised of a plurality of wavelengths from a first input source in a first optical demultiplexer;
separating the received light into light of each of the plurality of wavelengths using the first optical demulitplexer;
providing the light of each particular one of the plurality of wavelengths from the first optical demultiplexer to one of a plurality of photodiodes that converts the particular one of the plurality of wavelengths into electrical signals;
receiving light comprised of a plurality of wavelengths from a second input source in a second optical demultiplexer;
separating the received light into light of each of the plurality of wavelengths using the second optical demulitplexer;
providing the light of each particular one of the plurality of wavelengths from the second optical demultiplexer to one of a plurality of photodiodes that converts the particular one of the plurality of wavelengths into electrical signals; and
converting the received light of a particular wavelength to electrical signals in each one of the plurality of photodiodes.

* * * * *